Dec. 21, 1948.  G. C. SZIKLAI  2,457,008
FREQUENCY CONVERTER CIRCUIT
Filed Dec. 21, 1944

INVENTOR.
GEORGE C. SZIKLAI
BY
H. G. Grover
ATTORNEY.

Patented Dec. 21, 1948

2,457,008

UNITED STATES PATENT OFFICE 2,457,008

FREQUENCY CONVERTER CIRCUIT

George C. Sziklai, Princeton, N. J., assignor to Radio Corporation of America, a corporation of Delaware Application December 21, 1944, Serial No. 569,228

5 Claims. (Cl. 250—20)

My present invention relates to converter circuits such as are used, for example, in radio receivers of the superheterodyne type, and more particularly to a converter circuit particularly suited for operation at high frequencies and for utilization in the reception of television or other wide-band signals.

It is one of the objects of the invention to provide a simple, three-element, frequency converter which has good stability, contributes comparatively small shot noise and possesses better signal-to-noise characteristics than converters employing multi-grid tubes.

A further object of the invention is to provide a converter stage utilizing a three-element or triode electron discharge tube which is coupled to the succeeding or intermediate frequency (I. F.) stage by cathode follower action.

A still further object of the invention is to provide an improved converter stage for operation particularly at high frequencies, and in which the signal and locally-produced oscillations are applied between the grid of the converter tube and ground, and the resulting beat frequency is derived from a circuit connected between the cathode of the converter tube and ground.

Another object is to provide a high frequency converter system which utilizes a triode in a cathode output circuit, with an I. F. transformer between its cathode and ground providing a voltage step-up for the first I. F. amplifier, the noiseless resistance component of the cathode impedance being utilized to obtain the required bandwidth.

A more specific object is to provide a high frequency converter system in which there is utilized as the converter tube an electron discharge tube of the triode type, a circuit tuned to the frequency of signal oscillations connected between the control grid and ground, a source of local oscillations coupled to the tuned circuit, and coupling means constituted by a step-up or auto-transformer between the output of the converter tube and the input to the succeeding I. F. amplifier.

The novel features characteristic of my invention are set forth with particularity in the appended claims. The invention itself, however, both as to its organization and mode of operation together with further objects and advantages thereof, will best be understood by reference to the following description taken in connection with the accompanying drawing in which Fig. 1 shows a preferred embodiment of the invention, and Fig. 2 shows a modification of a portion of the circuit shown in Fig. 1.

Figure 1:
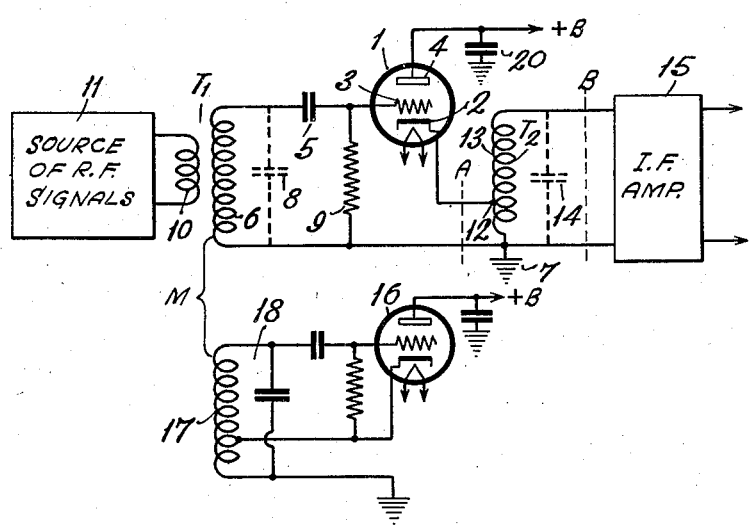
Figure 2:
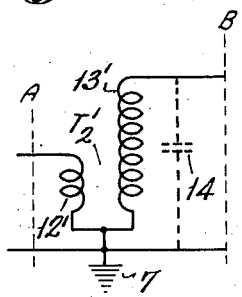

Referring to Fig. 1 of the drawing there is shown at 1 an electron discharge device connected to serve as a frequency converter, or first-detector, in a receiver of the superheterodyne type. This discharge device is of the triode type and comprises a cathode 2 shown as of the indirectly heated type, a signal control grid 3 and an anode 4. The control grid 3 is connected through coupling condenser 5 to one end of a secondary winding 6 of an input transformer $T_1$, the other end of the secondary winding being connected to ground at 7. The condenser 8, shown dotted, represents the inherent capacitance (grid-to-cathode capacity, distributed capacity of winding 6, etc.) and any further capacity which may be shunted across winding 6. For operation in present television frequency bands the inherent capacity is usually sufficient to tune the input circuit of the converter to the received signal oscillations. Resistor 9 is the usual grid-leak resistance which is connected between grid and ground. The primary winding 10 of the input transformer $T_1$ may be connected in any suitable known manner to a source of television or other radio frequency (R. F.) signals shown by the block 11, which may be an antenna or a preceding R. F. amplifier stage.

The cathode 2 of the converter is connected to a tap 12 on a coil 13 acting as an auto-transformer $T_2$ which together with the inherent capacitance 14 and any further capacity which may be provided constitutes the input circuit of the intermediate frequency (I. F.) amplifier stage 15. The anode 4 of the converter is connected to a suitable source of D. C. potential represented by B+ and is by-passed to ground through a condenser 20.

The same results are obtainable with the use of a step-up transformer in place of the auto-transformer $T_2$ of Fig. 1. As shown in Fig. 2 the portion of the circuit in Fig. 1 between the dash lines A and B has been replaced by a step-up transformer $T_2'$ comprising a primary winding 12' included in the cathode circuit and a secondary winding 13' included in the input to the I. F. amplifier.

The impedance of the cathode to ground portion of the circuit is equal to the reciprocal value of the tube transconductance. This impedance may therefore be used for loading the output circuit in order to obtain the required band-width. Since the resistive component of this impedance has only slight thermal agitation currents it does not contribute to the noise of the coupling circuit.

The local oscillator may be of any suitable type but is shown, by way of example, as of the Hartley type utilizing a triode 16. The coil 17 of the frequency determining circuit 18 of the oscillator is inductively coupled to the input coil 6 of the converter stage by the mutual inductance represented by M. If desired other coupling methods may be employed to feed the locally-produced oscillations to the input of the converter.

It will be seen from the above that I have provided a simple frequency converter, which due to the use of a triode tube contributes considerably lower noise and possesses better signal-to-noise characteristics than multi-grid converter tubes, such as the pentagrid converter. Since in conventional converter stages the I. F. circuits appear to have a considerable capacitively reactive component for the R. F. signal, it may provide regeneration if such circuits are included in the output or plate circuit of the converter. To overcome this difficulty it has been proposed to resort to push-pull bucking operation or other neutralization schemes. According to the present invention, as will be seen from the circuits of the drawing, the I. F. amplifier stage is connected to the cathode of the converter tube through an auto-transformer $T_2$ or step-up transformer $T_2'$. Since the cathode circuit appears substantially like a short circuit for R. F. currents, that is, it has practically no impedance at the frequency of these currents, the R. F. signal fed to the grid of the converter is not degenerated. There is, however, considerable degeneration for the I. F. current which is produced by beating the local oscillator current induced into the grid circuit with the radio frequency signal currents, but the noise generated in the I. F. circuit is degenerated to the same degree as the I. F. current, there being a bucking feedback voltage generated by the plate current across the cathode impedance. Since the I. F. produced has a low potential and is supplied by a low impedance, it is transformed up to match the impedance of the first I. F. amplifier grid circuit.

The stability of the converter circuits herein described may be explained further by the fact that, since the plate is grounded for alternating currents, the cathode is the only point at which an R. F. signal can appear besides the input grid terminal. Since the signal voltage is always lower at the cathode than at the grid, the feedback through the cathode-grid capacity will have negligible effect. The signal developed between the cathode and ground is then transformed up as far as the band-width and capacitance 14 permits, but the high signal potential at the top of transformer secondary 13 or 13' has little or no coupling to the signal input grid 3.

While it is true that the conversion gain of the cathode follower-transformer converter is only the square root of that of a conventional grounded-cathode converter, with a tube having the same transconductance, it has an equivalent noise resistance at least 10 times lower, thus permitting greater I. F. amplification without producing excessive noise.

While I have shown and described a preferred embodiment of my invention, it will be understood that various modifications and changes will occur to those skilled in the art without departing from the spirit and scope of this invention.

What I claim is:

1. The combination, in a superheterodyne receiver, of an electron discharge converter having a cathode, a control grid and an anode, a circuit tuned to the frequency of signal oscillations connected between the control grid and ground, a source of local oscillations coupled to said tuned circuit, and an output circuit for deriving the resultant intermediate frequency having one end connected to ground and an intermediate point connected to the cathode of the converter.

2. A high frequency converter system comprising an electron discharge tube provided with a cathode, a control grid and an anode, a circuit tuned to the frequency of signal oscillations connected between the control grid and ground, a source of local oscillations coupled to said tuned circuit, and an output circuit for deriving the resultant intermediate frequency, said output circuit comprising a step-up transformer the primary winding of which is connected between the converter cathode and ground.

3. The combination, in a superheterodyne receiver, of an electron discharge converter having a cathode, a control grid and an anode, a circuit tuned to the frequency of signal oscillations connected between the control grid and ground, a source of local oscillations inductively coupled to said tuned circuit, an amplifier having an input circuit including an inductance tuned to the resultant intermediate frequency, and a connection from the cathode of the converter to an intermediate point on the inductance of the intermediate frequency amplifier input circuit said cathode connection being at a potential above ground.

4. A high frequency converter system comprising an electron discharge tube provided with a cathode, a control grid and an anode, a circuit tuned to the frequency of signal oscillations connected between the control grid and ground, a source of local oscillations coupled to said tuned circuit, an output circuit for deriving the resultant intermediate frequency, and means for coupling the cathode of the converter to said output circuit, said coupling means constituting an auto-transformer.

5. The combination, in a superheterodyne receiver, of an electron discharge converter having a cathode, a control grid and an anode, a circuit tuned to the frequency of signal oscillations connected between the control grid and ground, a source of local oscillations inductively coupled to said tuned circuit, an intermediate frequency amplifier having an input circuit including an inductance coil which is grounded at one end, and a connection from the cathode of the converter to an intermediate point of the coil of the amplifier input circuit, said cathode connection being at a potential above ground.

GEORGE C. SZIKLAI.

REFERENCES CITED

The following references are of record in the file of this patent:

UNITED STATES PATENTS

| Number | Name | Date |
|---|---|---|
| 1,700,393 | Winther | Jan. 29, 1929 |
| 1,746,576 | Beers | Feb. 11, 1930 |
| 1,909,940 | Farnham | May 23, 1933 |
| 1,910,239 | Carlson | May 23, 1933 |
| 1,943,788 | Franham | Jan. 16, 1934 |
| 2,285,372 | Strutt et al. | June 2, 1942 |